United States Patent [19]

Glen

[11] E Re. 31,513

[45] Reissued Jan. 31, 1984

[54] BLANCHING, PASTEURIZING AND STERILIZING PROCESS AND APPARATUS SUITABLE THEREFOR

[76] Inventor: Donald H. G. Glen, 83 Merivale St., Tumut, New South Wales, Australia

[21] Appl. No.: 444,380

[22] Filed: Nov. 26, 1982

Related U.S. Patent Documents

Reissue of:

[64] Patent No.: 4,255,459
Issued: Mar. 10, 1981
Appl. No.: 11,365
Filed: Feb. 12, 1979

[30] Foreign Application Priority Data

Feb. 10, 1978 [CH] Switzerland ..... 1483/78

[51] Int. Cl.[3] ..... A01G 1/04

[52] U.S. Cl. ..... 426/521; 99/470; 99/471; 426/510

[58] Field of Search ..... 426/509, 510, 521, 520; 99/471, 470

[56] References Cited

U.S. PATENT DOCUMENTS

| | | | |
|---|---|---|---|
| 2,403,871 | 7/1946 | McBean | 426/510 |
| 2,948,619 | 8/1960 | Ashley | 99/470 X |
| 3,086,868 | 4/1963 | Keifer | 426/510 |
| 3,794,500 | 2/1974 | Lazar et al. | 426/511 |
| 4,059,919 | 11/1977 | Green | 426/521 X |

*Primary Examiner*—Arthur D. Kellogg
*Attorney, Agent, or Firm*—Steinberg & Raskin

[57] ABSTRACT

A method is provided which permits continuous and rapid blanching or sterilization of foodstuffs in particulate form. The foodstuff is heated rapidly to penetrate the outer portion of the particle by steam or gas under pressure, the heated particles are maintained thereunder until inactivation or destruction of microorganisms and enzymes, after which the pressure and temperature are lowered rapidly.

4 Claims, 12 Drawing Figures

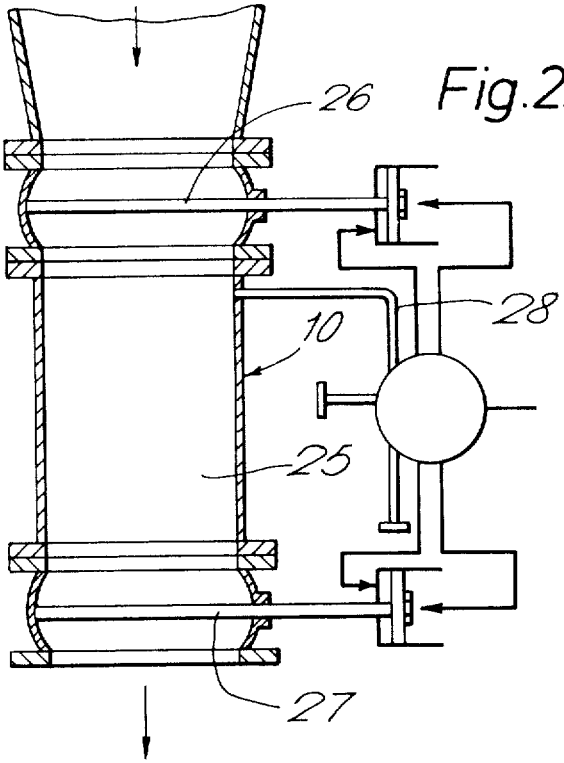
Fig.2A.
Fig.2B.
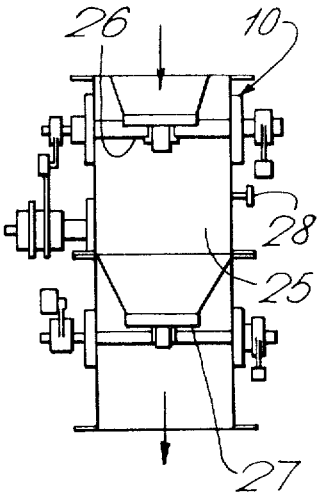
Fig.3.
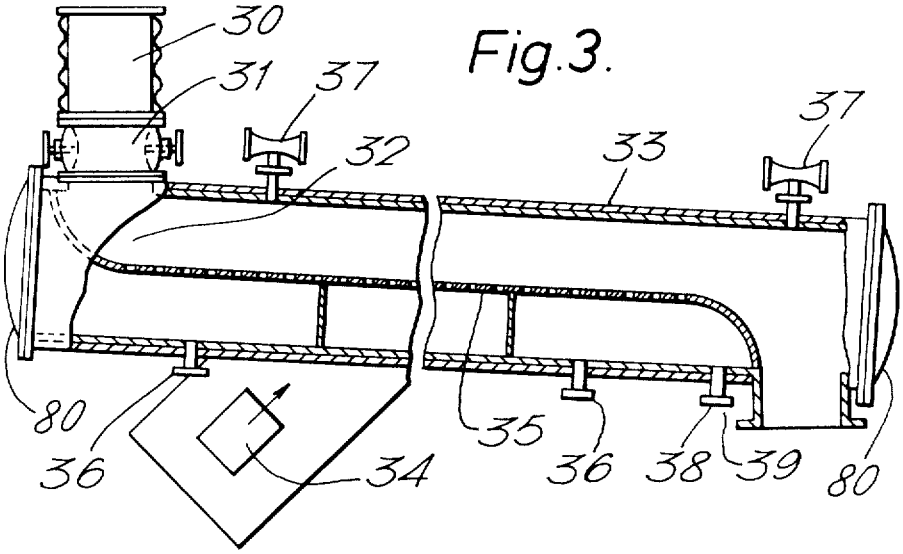

BLANCHING, PASTEURIZING AND STERILIZING PROCESS AND APPARATUS SUITABLE THEREFOR

Matter enclosed in heavy brackets [ ] appears in the original patent but forms no part of this reissue specification; matter printed in italics indicates the additions made by reissue.

This invention relates to method and apparatus for treatment of fruit and vegetable meat fish and other perishable products in particulate as well as pulp form using heating and cooling to preserve such products.

In one modification the invention is especially applicable to the process of blanching or sterilising of perishable products prior to containerisation and freezing and wherein the said products are heated to a particular temperature for a specific period of time.

By heating the product, the oxygen between the cells, like any gas, expands and is partially released from the product. Secondly, to enable the digestive process to occur, enzymes in the form of catalysts must be present. These are inhibited or destroyed by raising them above certain temperatures for specific lengths of time. Thirdly, in the process of canning, blanching has a further use in that it softens the fibre structure, thus enabling it to be placed in a can more readily, and the correct "fill weight" obtained.

Subsequently to blanching the product is either placed in a can, sealed and sterilised, or frozen and maintained at a temperature sufficiently low to prevent bacterial growth.

Blanching methods at present in use not only have a tendency to mechanically damage the product, causing a breakup and product losses, but also to leach the product of sugars and starches. Leaching is accentuated under vacuum conditions whereby the esters, the sugars and the starches are removed but when breaking the vacuum under steam the cell structure is reformed by replacing the solution of sugars and starches which have been removed with the condensate from the steam. This results in possibly an increase in weight of the product through the blanching process as more water can be put back than solution taken out, but the taste and the sugars are not replaced and the quality of the product is damaged, although the structure is good.

The time in which the product must be subjected to the abovementioned blanching conditions is dependent on the conductivity of the product so that the temperature to which the product is exposed on the outside can penetrate to the middle point of the product to ensure that the very centre is adequately blanched. From this, it will be seen that if one considers the product as a sphere, the outside layer will be subjected to the blanching temperatures and conditions far longer than that required to blanch the inside of the product for the outside layer must remain under these conditions until the very centre has been blanched, i.e. throughout the time of conduction to the centre.

The invention according to one aspect resides in a continous process for the rapid or flash blanching of foodstuffs such as portions of fruit vegetables or perishables which comprises applying heat rapidly to the external surface of the portions by means of a hot gas or fluid or a mixture of both passed over the portions to achieve a mass average temperature and then holding the heated portions adiabatically in an insulated zone without the further application of external heat to enable temperature to equilibrate from the heated external surface of the portions to the interior part of the portions.

The invention according to another aspect provides a continuous process for the rapid or flash blanching or sterilisation of foodstuff particulates under pressure involving high temperature, short time sterilisation and asceptic packing out of foodstuff particulates by the application of heat rapidly under pressure and allowing it to penetrate inwardly adiabatically through temperatures and pressures within the system and thus holding the product therein to destroy or reduce the microorganic population and their rate of fission for preservation and use when required.

Direct application of high temperature heating media to the product, under pressure, whilst in transit through the system within a vibro tube or spiral conveyor down a gradient of from 8° to 15° with the aid of a fluidised bed which is the vessel for the nesessary heat transferrance to the product so as to achieve its required specified mass average temperature in order to sterilise it once equilibrated.

In the second stage the product is then equilibrated to the required temperature and held for the required time until commercially sterile.

The thermal time/temperature death curve of microorganisms is logarithmic and therefore the essence of this process is to raise the temperature of the product as quickly as possible so as to balance the external and internal temperatures of the particle with the view of rapid throughout sterilisation at a temperature which will least affect the physical chemical and nutritional value of the product.

Once commercial sterilisation has been achieved the process is reversed as quickly as possible so as to avoid further deterioration of the product. The temperature at centre of the product being the critical factor.

The transfer or conduction of heat in a mass is a function of the temperature differential (amongst other things) such that the higher the applied temperature above the initial temperature, the greater the reduction in time to achieve the desired temperature.

When latent heat of condensing steam is used to heat the product particles directly, an insulating later of condensed steam forms on the surface area of the particle, at a lower temperature and pressure than that of the steam, and provides as well the conditions for an osmotic withdrawal of solutions from the product, through the membranes.

By the removal or non-formation of this later by the use of the fluidising heat media, the temperature differential can be maintained, the surface heat transfer increased, conduction in the mass improved and a substantial reduction in time is obtained. Further effluent is minimised, and product recovery is increased.

The conduction of heat is a function of the surface area and the thickness such that by maintaining the individuality of the product particles on a thin fluidised bed and using the oscillation amplitude and gradient to traverse the product, the time of heat transfer is reduced.

When the time is reduced, as the Thermal, Mechanical Vitamin and Nutritional colour and osmotic degradation is a function of time above a base temperature, the quality, the recovery, and the cost of the product is substantially reduced, and bulk packaging can be achieved.

Thus the product particle is subjected to the heating conditions at higher than normal blanching temperatures only until the required B.T.U.'s have been absorbed into the particle in sufficient quantity which when universally spread through the particle will raise it throughout to the required blanching or sterilising temperature.

In one preferred application of the method of rapid blanching in accordance with the invention and which is adapted for continuous blanching and/or pressure sterilizing of fruit vegetables and perishable products, the product is rapidly passed through a heating unit whilst spread on a grid belt or the like at a minimal thickness of, ideally, one particulate deep and a hot gas or fluid stream of steam or a mixture of both passed through acid over the pieces and the time taken for it to pass through the heating unit is only sufficient for it to absorb the correct amount of heat to raise the total product to the required temperature subsequently in the holding unit.

The product is then transferred to an insulated holding chamber for a time sufficient to allow the temperature throughout the product to reach equilibrium; and equilibrium temperature and time being to inhibit enzymes and destroy, or reduce the growth rate, of any microoganisms and release their oxygen. The preferred holding time is from 1½ to 5 minutes and no further heat is added during this time.

According to what may be a preferred feature of a blanching or sterilising process in accordance with the present invention, the product temperature in the heating section is obtained by the use of boiling water sprays or steam.

According to a modification of the process, the hot water sprays in the initial section of the heating unit are replaced by a dry combustion fan whose humidity is controlled by the injection of water vapour to obtain in this section a 10% dehumidification of the particle on the outside surface which a re-humidified in the last sections of the heating unit by the absorption from the water sprays. A further 5% recovery will be gained thereby.

According to a further modification of the inventive process, the belt or grid on which the product is carried through the heating section maybe replaced by a fluidised bed system whereby the product particulates are carried on a stream of hot gas and condensate through the chamber in a similar manner to that used in fluidised freezing which will entirely eliminate most all mechanical damage from the inpingement of the water on the product.

The invention according to a further aspect provides apparatus for carrying out the process of rapid heat blanching or sterilising of foodstuff particulates which comprises a plurality of heat treatment chambers comprising a first or heat treatment chamber with means for supporting and conveying the foodstuffs, means for passing hot gases or gaseous fluid along the chamber and in contact with the external surfaces of the fruit and a second or thermally insulated holding chamber for enabling heat from the externally heated surfaces of the foodstuff particulates to penetrate to the central region of the foodstuff without further application of heat.

The invention according to a still further aspect provides apparatus for carrying out the process of continuous rapid heat blanching and sterilisation of foodstuff particulates such as fruit vegetable or protein pieces and which comprises a plurality of interconnected heat exchanger means for continuously treating said foodstuff pieces within a series of heat and cool application treatment and pressure heat and cool holding, heat and cool penetration treatment zones along the heat and cool exchanger means, means for feeding foodstuff particulates into the heat exchanger means, means for conveying the foodstuff along the heat and cool exchanger means and means for introducing heat and cool treatment gases or fluid into the exchanger means and in direct contact with the external surfaces of the foodstuff pieces, and means for maintaining pressure and temperature in the heat holding heat penetration zone or zones and means for discharging the foodstuff particulates without loss of pressure, and means for asceptically packing out the particulate products.

Preferably the apparatus includes separate means for recycling hot heat treatment or application gases or fluids from the discharge end of the first heat treatment chamber or zones to the feed end of the first heat treatment chamber or zones.

The invention will be further described with reference to the accompanying drawings in which:

FIGS. 2A and 2B represent side-elevation views of two embodiments of the In-Feed unit of the apparatus of the present invention;

FIG. 3 is a side elevation view of the Pre-Heat Float Feed Control Chamber and the Heat Units;

Figure 1:
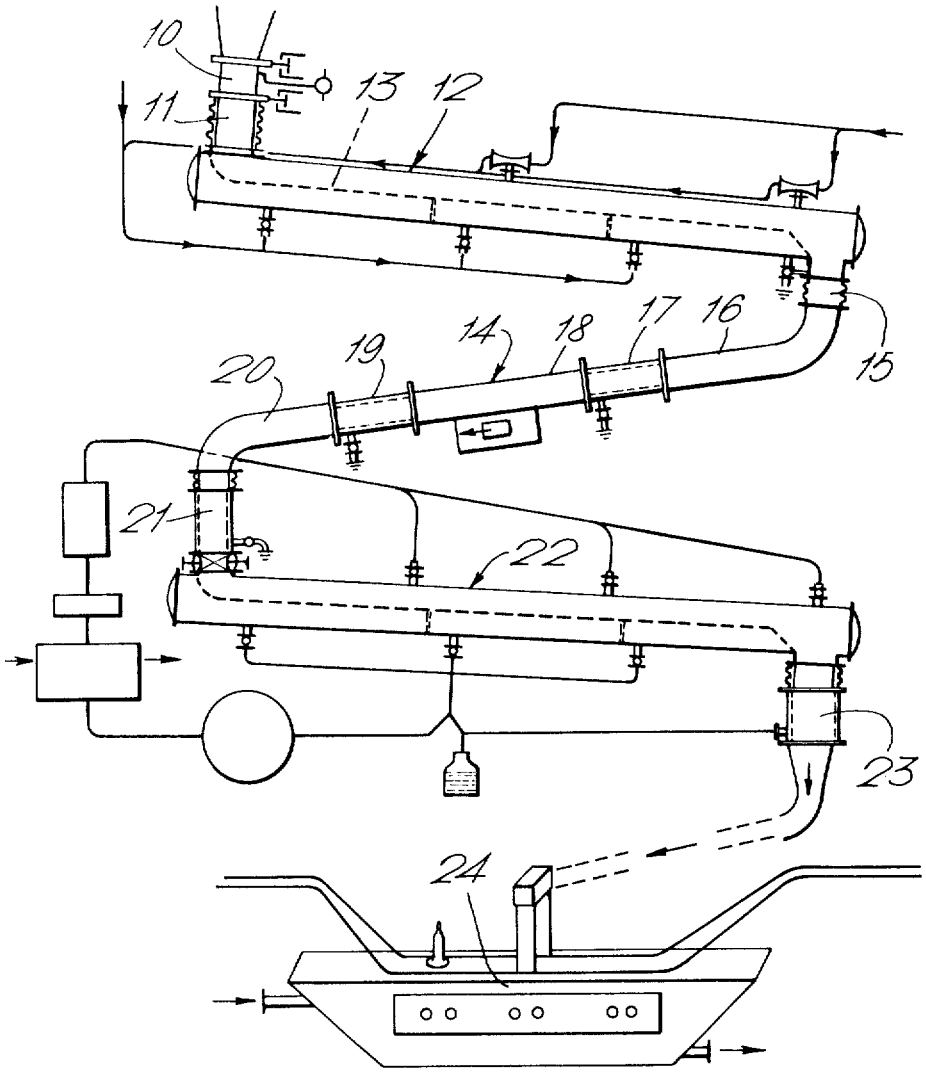
FIG. 1 is a diagrammatic representation of apparatus in accordance with the present invention.

Referring to FIG. 1 the product is fed into the apparatus from an elevator-controller, which delivers a specified volume at specific intervals directly into the in-feed unit 10 of the apparatus, whose operation it controls. The in-feed unit, by a pressure equalising device and cycled valve operation, feeds the product into the pressurised system within the apparatus against the operating pressure.

A pre-heat unit 11 is interposed between the in-feed unit 10 and the heat unit 12 to act as a float chamber from which the heat unit draws the product at a constant rate and layer thickness onto the perforated carrier plate 13. The heat unit 12 raises the temperature of the product to the mass average temperature needed for short time sterilization and inhibition of enzymes. The heat unit comprises a vibro tube or spiral conveyor set at an angle of about 8° to 15° to the horizontal with a perforated support or carrier plate 13 extending axially throughout the tubular heat unit, along which the product travels at minimal layer thickness or depth by oscillation on a fluidized bed provided by the heating media of steam/gas passing through the perforated support plate 13 to the product and transmitting to it sufficient heat to raise the particulate mass average temperature to that called up by the standard data. The heating media used is a steam-gas mix which maintains the applied temperature differential, eliminates the insulating surface layer of condensed steam, and the osmotic withdrawal of the solutions in the product, improving to conductivity to achieve a short heating time.

The heat unit 12 is connected to the adiabatic equilibrating unit 14 via flexible connection bellows 15 and slopes away from the heat unit at an angle of about 5° to the horizontal. The equilibrating unit comprises first and second equilibrating chambers (16 and 18, respectively), first and second pressure drop chambers (17 and 19, respectively), and an inactivating chamber 20. The equilibrating unit receives the product at mass average temperature and during its transit through this unit allow the temperature to equilibrate to the centre and throughout from the mass average temperature, holding it at this temperature to inhibit or destroy the microorganisms and enzymes, such that the product is sterilised to a commercially acceptable level. At the same time it drops the pressure from the maximum for mass average temperature to the equilibrated temperature and pressure.

The pressure differential flash off chamber 21 receives the product from the equilibrating unit and partially cools it by 'flashing off' by dropping the pressure. This chamber also acts as a float chamber from which the cooling unit 22 draws the product at a constant rate and layer thickness.

The cooling unit 22 lowers the mass average temperature to that required for thermal and mechanical stability. The cooling unit is a similar unit to the heat unit 12, operating on the same principle, save that the heating steam/gas media is replaced by a cooling gas in closed circuit through a heat exchanger, de-waterer, and bacteria filter. Under certain circumstances, and for certain products, a bleed in of atomised refrigerant is used to obtain a lower applied temperature.

The out-feed unit 23 receives the product from the cooling unit 22, acting as a float and pressure drop chamber and equilibrating the product at the same time.

The asceptic packing out unit 24 of filler-isolator receives the product for packaging under inert and sterile conditions.

FIGS. 2a and 2b show details of alternatives for the in-feed unit 10. The unit comprises a pressure lock chamber 25 with automatically operated inlet and outlet valves (26 and 27, respectively) into which the gas to partially dehydrate the product is fed via conduit 28, at the same time providing an additional force to drive the product out of the chamber and down the pre-heat unit.

Referring to FIG. 3 the pre-heat float feed control chamber comprises a stainless steel tube 30 through which the product passes to partially dehydrate the surface with a valve 31 at the base which varies the outlet orifice in relation to the height 32, thus controlling the outflow pattern and the depth of the product on the heat unit carrier plate. The heat unit comprises a stainless steel pressure tube or cylinder 33, which is vibrated by out-of-balance motors or vibro-magnets 34, the tube being set at an angle to the horizontal, providing a transporting oscillation on the perforated carrier plate 35, which is fixed in the same plane as the tube. The heating media is fed into the tube at the bottom 36, passing up through the carrier plate and fluidising the product. It is drawn out by ejectors 37, having lost part of its latent heat, in a super-saturated condition, is reheated in the ejectors by the steam supply, and by exhaust burner gases and re-cycled.

Some liquid condensate is passed out through the drain 38 and is either carried forward with the product, or lost to sink at 39.

Figure 4:
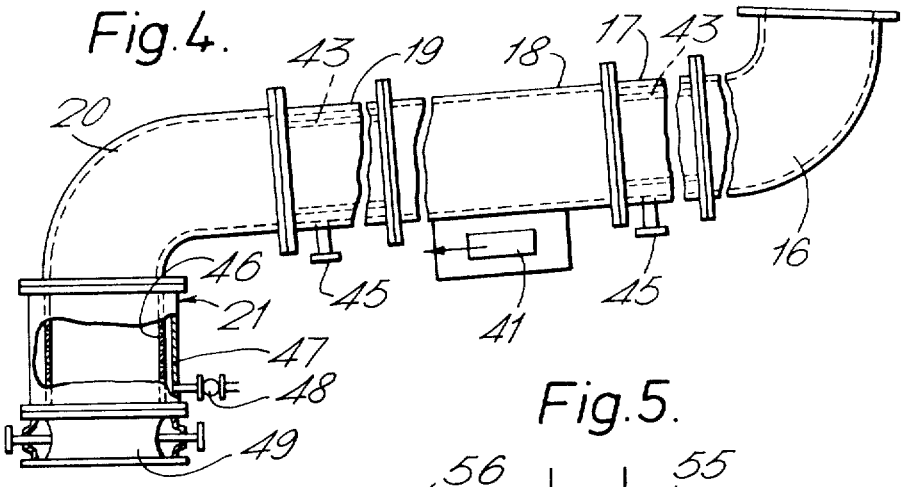
FIG. 4 is a side elevation view of the Adiabatic Equilibrating, Inactivating and Flash-off unit.

FIG. 4 illustrates more detail of the adiabatic equilibrating, inactivating and flash off unit sections of apparatus illustrated in FIG. 1. The equilibrating unit comprises first and second equilibrating chambers 16 and 18, first and second pressure drop or release chambers 17 and 19 with outlets 45. The pressure release chambers have an inner perforated chamber 43 to facilitate gas permeation. The second pressure release chamber is connected to the inactivating chamber 20, which in turn is connected to the flash off feed control chamber 21 which comprises an inner perforated annular chamber 46 which releases the pressure to the outer annular chamber 47, the pressure in which is controlled by a release valve 48. At the lower end of the flash off chamber a valve 49 varies the outlet orifice in relation to the height 32 (FIG. 3), thus controlling the outflow pattern and the depth of the product on the carrier plate of the cooling unit 22 (FIG. 1).

Figure 5:
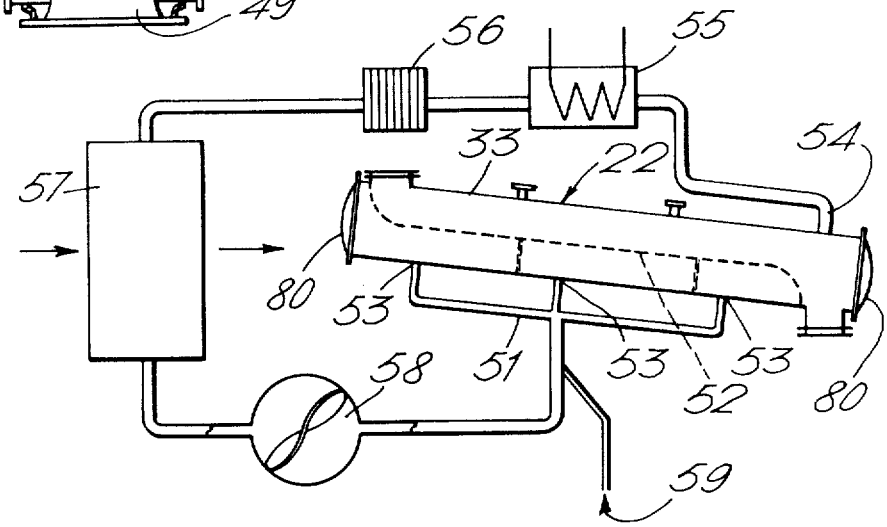
FIG. 5 is a side elevation of the Flash-off Float Feed Control Chamber and the Cool Unit incorporating a gas closed circuit.

Referring to FIG. 5 the cooling unit 22 comprises a stainless steel cyindrical tube 33 which is similar in design and operation to the heat unit illustrated in FIG. 3. (especially items 33, 34 and 35 thereof), but the heating media is replaced by a cooling carrier gas, which is inert and sterile, and is fed into the cylindrical chamber 33 via inlets 54 to maintain an approximate 0° . C. temperature at the product surface on the perforated carrier plate 52, fluidising the product, and absorbing heat from it.

The inert sterile cooling media carrier gas is in closed circuit, passing into the cooling unit, via conduit 51 and inlets 53, at a temperature of approximately 0° C.; the carrier gas then passes through the perforated carrier plate 52, and the product thereon, fluidising the product and absorbing heat therefrom. The carrier gas then passes out of the cooling unit via conduit 54 at a temperature of approximately 75° C., through a de-waterer 55, and a bacteria filter 56, to the heat exchanger 57, and back to the pump or fan 58. Before re-entering the cooling unit, the carrier gas receives a boost charge of atomised liquified gas from conduit 59. The atomised liquified gas is at a temperature of −80° to −196° C., depending on the gas used, to reduce the temperature of the gas re-entering the cylindrical chamber 33 to approximately 0° C., to maximise the temperature differential and thus the conduction, as well as the discharge from the out-feed unit 23 (FIG. 1). Alternatively, the cooling unit can be used as the evaporator in a refrigeration cycle, in conjunction with a compressor and condensor.

Referring to FIGS. 3 and 5 the cylindrical chambers of both the heat unit and the cooling unit have quick opening end plates 80 for inspection and maintenance.

Figure 6:
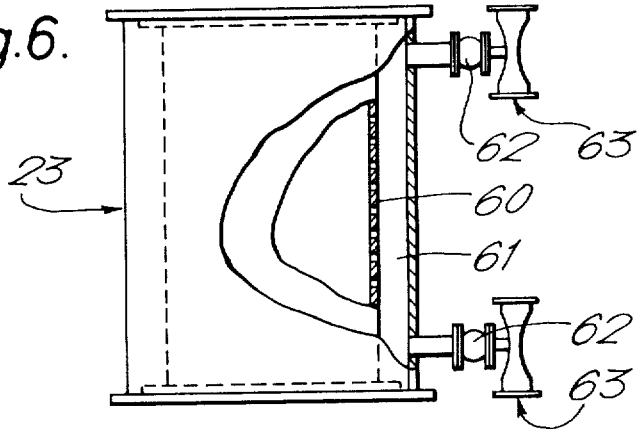
FIG. 6 is a side elevation of the Out-Feed Unit.

FIG. 6 illustrates more detail of the out feed unit 23 of the apparatus illustrated in FIG. 1. The out feed unit comprises a perforated inner cylinder 60, which releases the pressure to slightly above atmospheric to an outer annular chamber 61, the pressure in which is controlled by release valves 62, and thence back into the closed circuit via the bleed in system shown at 63.

Figure 7A:
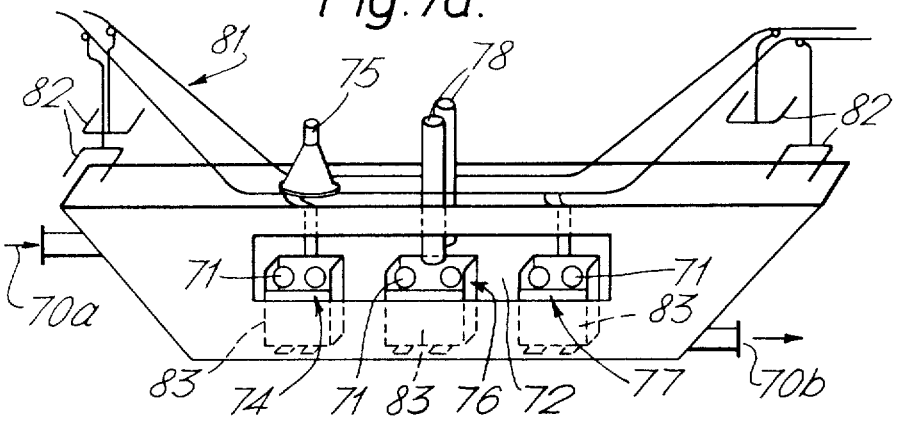
FIGS. 7a and 7B represent two embodiments of the asceptic Filler-Isolator or packing out unit.
Figure 7B:
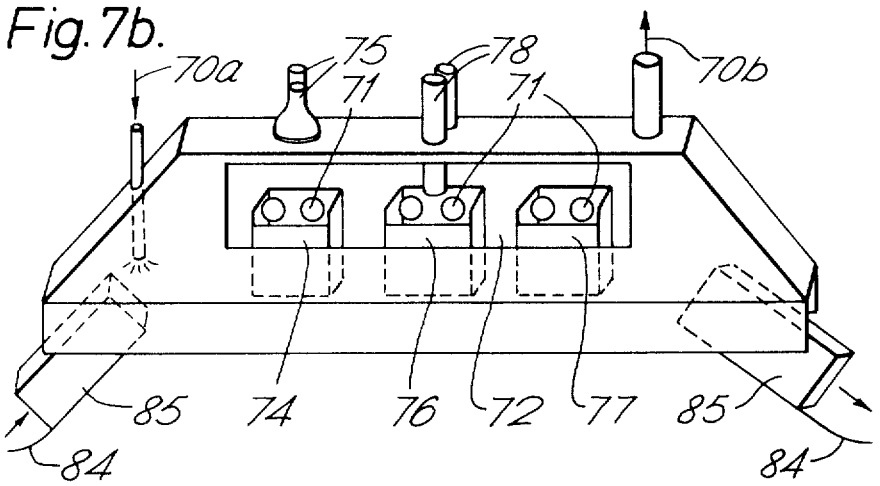

FIGS. 7a and 7b illustrate alternative forms of the asceptic packing out unit or filler-isolator. The embodiment illustrated in FIG. 7a is a well-type unit for heavier than air products and the embodiment illustrated in FIG. 7b is a diving bell type unit for lighter than air products. The gas inlet and gas outlet are represented by 70a and 70b, respectively. The product enters the packing out unit from the out-feed unit via the conduits 78. The carton or bag to be filled enters the packing out unit from the left-hand side, and the filled bags or cartons leave the packing out unit from the right hand side. In FIG. 7a there is an overhead rail system 81 along which carrier means 82 can run. The carrier means transport bags 83 via the ultra-violet (U.V.) light resterilisation station 74 (with overhead U.V. light source 75), the filling station 76 under the conduits 78, and the sealing station 77. The whole filling or packaging operation can be observed through observation window 72 and glove ports 71 allow for any required manual operations. In FIG. 7b there is a conveyor means 84 to convey cartons 85 through the packing out unit via the U.V. resterilisation station 74, the filling station 75 and the sealing station 77.

Figure 8:
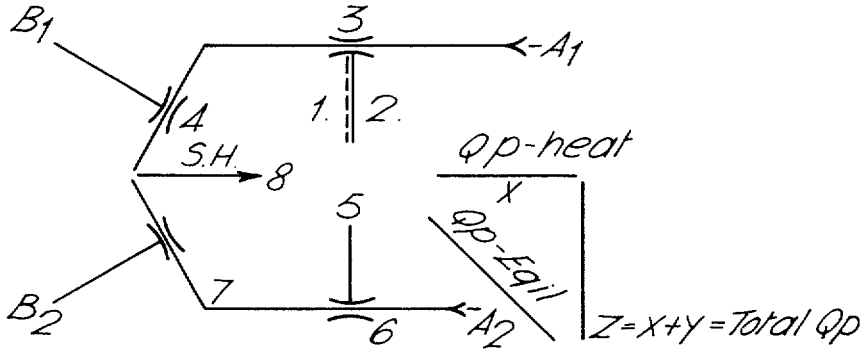
FIG. 8 is representative of a standard heat balance applicable to the process in accordance with the present invention.

In FIG. 8 an example is given of a specific standard heat balance where the product heat (Qp) is taken at 800,000 Kilojoules/hour, the steam supply pressure (SI,HI) is taken at 1,000 kpa and the transfer takes place in conformity with the selected standard conduction graphs at 150° C. and 380 Kpa to achieve a Mass average temperature of 133° C. (ref FIG. 9a). It is upon this that a computer program is written to provide a standard data heat balance for each product and product size and diffusity etc.

In FIG. 8 the steam is supplied at 1000 Kpa (A1) to the ejector (3) which withdraws the super-saturated exhaust from the heat unit, carrying with it globules of liquid (2) in the gas (1). A reheat of exhaust gas is supplied (4) from the burner (Bi), discharging to the underside of the carrier plate in the heat unit (8).

In FIG. 8 steam at 1000 Kpa is also supplied at option (A2) to an ejector (6) drawing from the condensate drain of the heat unit, and discharging it (7) through an exhaust gas reheat ejector (B2) to the underside of the carrier plate of the Heat Unit (8).

An optional portion of the drain of condensate is passed through to the equilibrating unit and the product at (Y) carrying with it a portion of the product heat (Qp2).

The product is discharged at (X) with the addition of (Qp1) such that the product is received into the equilibrating unit at (Z)=(X+Y)=(Qp). It should be noted that it is not necessary for both cycles to be used, together.

CYCLE HEAT BALANCE (Example)

| | | | | | | | | | |
|---|---|---|---|---|---|---|---|---|---|
| A1. | From | Bir Steam | 114 kg/Hr | 930 Kpa | 2784 | hg = | 317401 | kJ/hr | at 175° C. |
| 1. | From | Re-Circ Vap | 110 Kg/Hr | 482 Kpa | 2758 | hg = | 303406 | kJ/hr | at 150° C. |
| 2. | From | Re-Circ Lqd | 114 Kg/Hr | 482 Kpa | 636 | hg = | 72488 | kJ/hr | 150° C. |
| 3. | From | Total wet mix | 338 Kg/Hr | 551 Kpa | — | = | 693295 | kJ/hr | at 160° C. |
| B1. | From | Burner | (4.77) Kg/Hr | 50917 | | hg = | 242874 | kJ/hr | at —° C. |
| 4. | From | Total Dry Vap | 338 Kg/Hr | 551 Kpa | | hg = | 936069 | | |
| 5. | From | ink drain Lqd | 105 Kg/Hr | 551 Kpa | 2764 | hg = | 69141 | kJ/hr | at 150° C. |
| A2. | From | Blr Steam | 105 Kg/Hr | 930 Kpa | 2781 | hg = | 292009 | kJ/hr | at 175° C. |
| 7. | From | Totl. Wet Mix | 210 Kg/Hr | 551 Kpa | — | = | 361150 | kJ/hr | at 155° C. |
| B2. | From | Burner | (4.3) Kg/hr. | 59017 | | hg = | 218945 | kJ/hr | at —° C. |
| 8. | From | TOTAL INPUT | 546 Kg/Hr | 551 Kpa | 2774 | hg = | 1516164 | kJ/hr | at 160° 0. |
| X. | To | Qp - Heat | (3000 Kg/hr) | | | | 800000 | kJ/hr | at 133° C. |
| Y. | To | QP:Equi-6% wt | 180 Kg/Hr | 482 Kpa | 668 | hg = | 120245 | kJ/hr | at 155° C. |
| Z. | To | Total Qp | (3200 Kg/Hr) | | | = | 920245 | kJ/hr | at 133° C. MAT |
| L. | To | Losses & work say | 10% of 8. above | | | | | | |
| 5. | To | Sink drain Recirc | 105 Kg/Hr | 551 Kpa | 663 | hg = | 69140 | Kj/hr | at 150° C. |
| 1. | To | Vap Recirc | 110 Kg/Hr | 482 Kpa | 2758 | Kg = | 303406 | kJ/hr | at 150° C. |
| 2. | To | Lqd Recirc | 114 Kg/Hr | 482 Kpa | 636 | hg = | 72488 | kJ/hr | at 150° C. |
| | | TOTAL OUTPUT | | | | | 15167344 | | at |

TOTAL HEAT BALANCE (Example)

| | | | | | | | |
|---|---|---|---|---|---|---|---|
| IN. | A. Total Steam | A1 = | 114 | Kg at 930 Kpa | 2784 hg = | 317402 kJ/hr | |
| | | A2 = | 105 | Kg at 930 Kpa | 2784 hg = | 292009 kJ/hr | |
| | TOTAL | A | 219 | Kg at 930 Kpa | 2784 kg = | 609411 kJ/hr | |
| | B. Total Burner | B1 = | (4.77) | Kg | 50917 hg = | 242874 kJ/hr | |
| | | B2 = | (4.3) | Kg | 50917 hg = | 218945 kJ/hr | |
| | TOTAL | B = | (9.1) | Kg | 50917 hg = | 46189 | |
| | TOTAL INPUT | | | | | =1071230 kJ/hr | |
| OUT | Qp - heat (x) | = 800000 | kJ/hr | | | | |
| | Qp - Equil (Y) | = 121245 | kJ/hr | | | | |
| | | 920245 | kJ/hr | | | | |
| | Allow losses & work | = 151455 | | | | | |
| | TOTAL OUTPUT | 10717007 | kJ/hr | | | | |

Figure 9B:
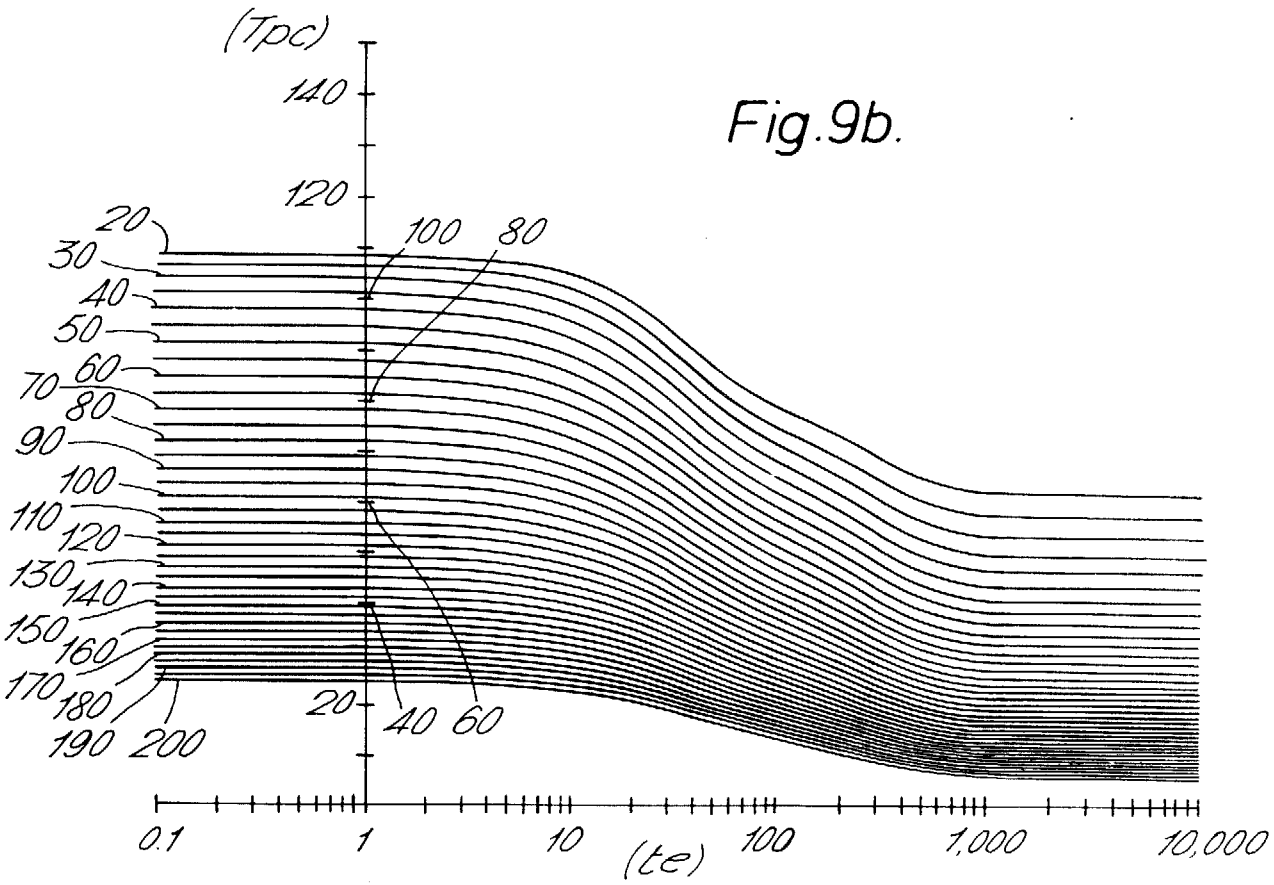
FIGS. 9A and 9B are representative of the Heat and Cool thermal conductivity Time/Temperature, Curves applicable to a preferred embodiment in accordance with the present invention.
Figure 9A:
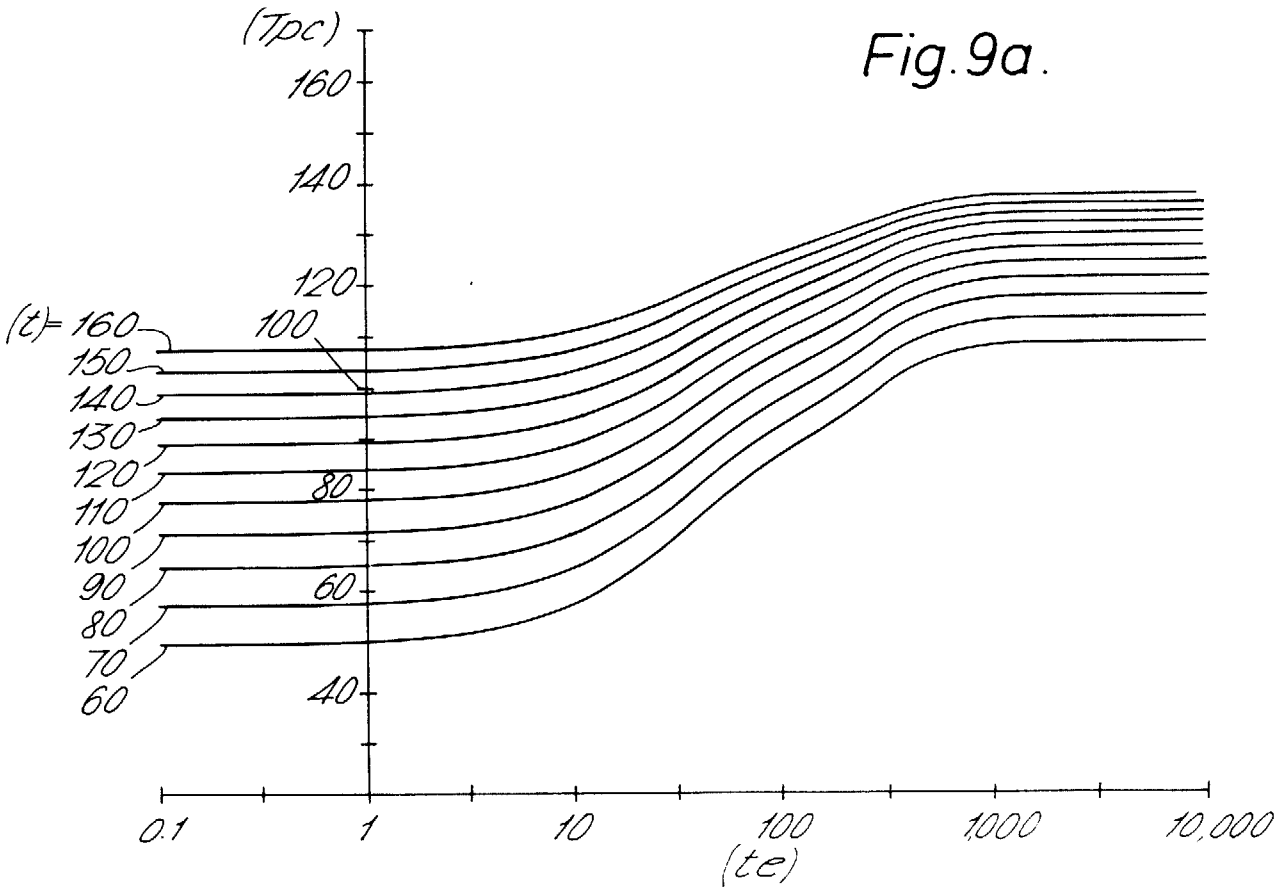

FIGS. 9a and 9b illustrate examples of the computer drawn Standard family of product graphs for heating time and temperature with adiabatic times and temperatures (9a) and cooling times and temperatures (9b) for an acidic product. Each family of graphs are drawn for a media supply temperature (Ts) and a particular product size and diffusity and initial temperature (Ti). Each graph in the family is drawn for a Heat or Cool time (t) in seconds to show the product centre temperature (tpc) achieved on the co-ordinate against the equilibrating time in seconds on the ordinate axis on a logarithmic scale (te).

Although the invention has been described above with reference to preferred embodiments, examples and drawings, it will be appreciated that numerous variations, modifications or alternatives may be substituted for specifically described features, without departing from the spirit or scope of the invention as broadly described.

I claim:

1. A continuous process for the rapid blanching and sterilization of foodstuffs in particulate form, such as portions of fruit, vegetables, meat or fish, which comprises continuously moving said foodstuff particles *in a* first *zone* through an elongated pressure chamber where [it is] *the same are* subjected under pressure to hot steam or gas *at a temperature and for a time sufficient* to rapidly heat the outer portion thereof [an] *and* to supply *thereto* sufficient heat to heat the foodstuff particles *when spread* throughout *the same* to the sterilization temperature thereof, then moving the thus heated foodstuff particles *in a second zone* through an elongated chamber where the pressure drops and said particles are maintained under *essentially* adiabatic conditions until the particles attain the sterilizing temperature throughout for the time necessary to inactivate or destroy the microorganisms and enzymes *and thus sterilize the food particles,* then moving the *thus sterilized* particles of foodstuff *in a third zone* through a cooling unit to effect cooling of the product, *and* moving the cooled product through an enclosed conveying system to a packing unit where it can be packed asceptically, [all of the] movement of the foodstuff particles being effected at least partly by gravity feed.

2. Apparatus for carrying out the *continuous* process of rapid [heat] blanching *and sterization* of foodstuff particulates which comprises an elongated *gas or* steam pressure chamber through which the foodstuff first moves, an adjacent elongated chamber *connected to said pressure chamber and being* under a pressure lower than *that of* said *gas or* steam pressure chamber through which the foodstuff next moves and wherein the pressure drops while the foodstuff is adiabatically [heated] *equilibrated throughout to the sterilization temperature thereof,* a cooling unit connected to said adjacent elongated chamber through which the adiabatically [heated] *equilibrated and sterilized* foodstuff then passes and is there cooled, and an elongated enclosed conveying system connected to said cooling unit and to a packing unit for conveying the foodstuff to the packing unit, [all of] said chambers and units being connected and angled to [give a] *effect movement of the foodstuff particles at least partly by* gravity feed.

*3. A continuous high-temperature short-time process for the rapid blanching and sterilization of foodstuffs in particulate form, such as portions of fruit, vegetables, meat or fish, which comprises continuously moving said foodstuff particles through a first zone where the same are subjected under pressure to hot steam or gas at a temperature and for a time sufficient to rapidly heat the outer portion thereof and to supply thereto sufficient heat to heat the particles when spread throughout the same to the sterilization temperature thereof, then moving the thus heated foodstuff particles through a second zone contiguous with said first zone where the pressure drops and said particles are allowed to equilibrate adiabatically until the particles attain the sterilization temperature throughout for the time necessary to inactivate or destroy the enzymes and microorganisms present, then moving the foodstuff particles through a third zone contiguous with said second zone to effect cooling of the product, and then moving the cooled product to a packing unit connected to said third zone where the said product can be packed aseptically.*

*4. Apparatus for carrying out a continuous high-temperature short-time process for the rapid blanching and sterilization of foodstuffs in particulate form which comprises an elongated pressure chamber having means which support and convey the particles and means to pass hot steam or gas along said pressure chamber to provide a first zone through which the particles first move while being subjected under pressure to hot steam or gas; an adjacent elongated chamber connected to said pressure chamber and being under a pressure lower than that of said pressure chamber to provide a second zone through which the particles next move and wherein the pressure drops while the particles are allowed to equilibrate adiabatically whereby the particles attain a sterilization temperature throughout; a cooling unit connected to said adjacent elongated chamber to provide a third zone through which the sterilized particles then pass and are there cooled; and an elongated enclosed conveying system connected to said cooling unit and to a packing unit for conveying the foodstuff to the packing unit.*

* * * * *